United States Patent [19]

Hofstetter

[11] 4,354,357

[45] Oct. 19, 1982

[54] CONVEYOR SYSTEM WITH COOLING MEANS

[76] Inventor: Robert W. Hofstetter, 14454 Swanee Beach Rd., Fenton, Mich. 48430

[21] Appl. No.: 252,174

[22] Filed: Apr. 8, 1981

Related U.S. Application Data

[63] Continuation of Ser. No. 90,896, Nov. 5, 1979, Pat. No. 4,261,181.

[51] Int. Cl.$^3$ ............................................. F25B 41/04
[52] U.S. Cl. ....................................... 62/216; 62/304; 62/374
[58] Field of Search ................... 62/374, 375, 380, 63, 62/304, 216; 198/952

[56] References Cited

U.S. PATENT DOCUMENTS

| | | | |
|---|---|---|---|
| 2,426,817 | 9/1947 | Charlton et al. | 62/64 |
| 2,776,544 | 1/1957 | Schulerud | 62/375 |
| 3,775,993 | 12/1973 | Murphy | 62/304 |
| 3,844,135 | 10/1974 | Zamiara | 62/375 |
| 4,000,625 | 1/1977 | Beerens et al. | 62/63 |

Primary Examiner—Ronald C. Capossela
Attorney, Agent, or Firm—Gifford, VanOphem, Sheridan & Sprinkle

[57] ABSTRACT

A conveyor system with cooling means is provided and comprises an elongated frame defining a conveyor track. An elongated conveyor is mounted within the frame so that a portion of the conveyor extends longitudinally along the conveyor track while a suitable motor longitudinally drives the conveyor along the conveyor track in a first direction. A plurality of cooling stations are also secured at longitudinally spaced positions along the frame so that the cooling stations are longitudinally adjacent each other. Each cooling station further includes a fluid reservoir beneath the conveyor track and a spray head positioned to spray fluid down onto the conveyor track. A pump is also provided for each cooling station and has its inlet connected to the fluid reservoir for that station while its outlet is connected to the spray head at the cooling station. The novelty of the present invention, however, resides in the provision of a thermocouple for sensing the fluid temperature in a fluid reservoir upstream from the outlet end of the conveyor system and, when the temperature in the upstream reservoir exceeds a predetermined value, fluidly connecting a source of relatively cool fluid to the fluid reservoir immediately adjacent the outlet of the conveyor system. In addition, a dam is provided between adjacent reservoirs so that the addition of relatively cool fluid to the reservoir immediately adjacent the outlet end of the conveyor system forces relatively cool water over the dam and into the reservoir second from the conveyor system outlet and so on throughout the length of the conveyor track. Evaporative cooling means are also preferably associated with one or more cooling stations in order to increase the overall cooling capability of the conveyor system.

6 Claims, 3 Drawing Figures

CONVEYOR SYSTEM WITH COOLING MEANS

This is a continuation of application Ser. No. 90,896, filed Nov. 5, 1979 now U.S. Pat. No. 4,261,181.

BACKGROUND OF THE INVENTION

I. Field of the Invention

The present invention relates generally to conveyor systems and, more particularly, to a conveyor system with cooling means.

II. Description of the Prior Art

There are a number of previously known conveyor systems with associated cooling means for cooling the articles transported by the conveyor system from one end to its other. In particular, there have been a number of previously known conveyor systems for pasteurized and/or cooked foods.

The previously known conveyor systems of this latter type have conventionally included an elongated frame defining an elongated track. A conveyor belt was mounted to the frame and along the conveyor track and, when longitudinally driven by a suitable motor means, moved in a first direction along the track from the inlet end of the conveyor system and toward the outlet end. The articles transported by the conveyor system are carried on top of the conveyor belt.

In order to cool the articles transported by conveyor systems of this type, it has been the previous practice to secure a plurality of both longitudinally and laterally spaced water spray heads to the frame along the entire length of the conveyor track. The spray heads are connected to a suitable source of relatively cold water under pressure and spray the water downwardly onto the articles transported by the conveyor track and then collect the water after impinging upon the transported articles. This water is then disposed of by dumping or other conventional methods.

There are, however, a number of disadvantages to this type of previously known conveyor system. One such disadvantage of this type of conveyor system is that the multiple spray heads are conventionally connected in common with each other so that all spray heads are continually operated regardless of need and whether or not articles are not present on any given portion of the conveyor track. In addition, the water which is collected within the reservoir is disposed of even though it is still relatively cool with respect to the transported articles thus resulting in high water volume requirements.

A still further disadvantage with this type of previously known conveyor system, is that it is difficult to accurately control the temperature of the articles exiting from the conveyor system. Accurate temperature control is difficult since the cool water from the water supply impinges upon the articles when the articles are very hot, i.e. upon entry to the conveyor system as well as throughout their entire travel along the conveyor track. Accurate temperature control, however, is important particularly for bottled food products in which the product must be cooled below 110° F. in order to prevent further cooking and/or discoloration caused by the cooking of the goods when they are stored. However, it is equally important that the product not be cooled too much, for example below 100° F., since further cooling of the product will cause the bottle to sweat and inhibit the labels from adhering to the bottles.

SUMMARY OF THE PRESENT INVENTION

The present invention provides an improved conveyor system with cooling means and which is particularly adapted for transporting bottled food products.

In brief, the present invention comprises an elongated frame defining a conveyor track along its interior. An endless conveyor belt extends along the conveyor track within the frame while suitable motor means longitudinally drives the conveyor belt in a first direction along a conveyor track and from an inlet end and to an outlet end of the conveyor track.

A plurality of independent cooling stations are longitudinally spaced along the conveyor track and are connected to the conveyor frame. Each cooling station comprises a fluid reservoir secured to the frame beneath the conveyor track and at least one water spray nozzle positioned to spray water upon articles transported by the conveyor belt. A pump has its inlet connected to the fluid reservoir and its outlet connected to the spray nozzle. Consequently, upon actuation, the fluid pump at each cooling station continually recirculates water from the reservoir and to the spray head at the cooling station.

Each fluid reservoir is separated from the next longitudinally adjacent food reservoir by means of a dam. Moreover, the effective height of the dam decreases from the outlet end of the conveyor track and towards its inlet. Consequently, as the water within the reservoir at the cooling station adjacent the outlet end of the conveyor track exceeds a predetermined level, water flows into the next and immediately upstream fluid reservoir and so on throughout the length of the conveyor system.

The present invention further includes means for accurately controlling the temperature of the bottled products as they exit from the conveyor system. This control means further comprises a temperature sensing means, such as a thermocouple, which detects the temperature of the water at a cooling station upstream from the outlet end of the conveyor track. When the temperature at this upstream station exceeds a predetermined amount, the temperature sensing means activates a control valve which supplies additional cool water from a water source and to the cooling station adjacent the outlet end of the conveyor track. This additional cool water not only provides additional cooling for the transported bottled products prior to their exit from the conveyor system, but in addition, causes relatively cool water in the reservoir adjacent the conveyor outlet to spill over the dam and into the next and relatively warmer reservoir and so on throughout the entire length of the conveyor track. Eventually, the very hot water in the reservoir adjacent the inlet end of the conveyor track overflows its dam and is disposed of by a drain. However, since the reservoirs for the cooling stations are separated from each other and contain water of progressively increasing temperature from the outlet end of the conveyor track and towards its inlet end, the consumption of cooling water is greatly minimized. Moreover, the means for controlling the introduction of fresh and cool water to the cooling station adjacent the outlet end of the conveyor track provides a simple and yet totally effective means for accurately controlling the temperature of the bottled product as it exits from the conveyor track.

The present invention further provides evaporative cooling associated with one or more of the cooling stations. The evaporative cooler comprises a fan which exhausts air and water vapor from the cooling station and exteriorly of the conveyor system. Evaporative cooling greatly enhances the cooling capability of the overall conveyor system while resulting in only minimal fluid loss from the system.

The evaporative cooler comprises a fan having its inlet open to the housing interior through which the conveyor belt extends while the outlet of the fan exhausts exteriorly of the conveyor housing. Upon activation of the fan, air and water vapor are inducted away from the housing interior and thus away from the conveyor belt. This action simultaneously increases the water evaporation from water in the reservoir as well as any water on the belt or on the articles carried by the belt. The increased water evaporation caused by the fan in turn cools the articles carried by the conveyor belt by evaporative cooling.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
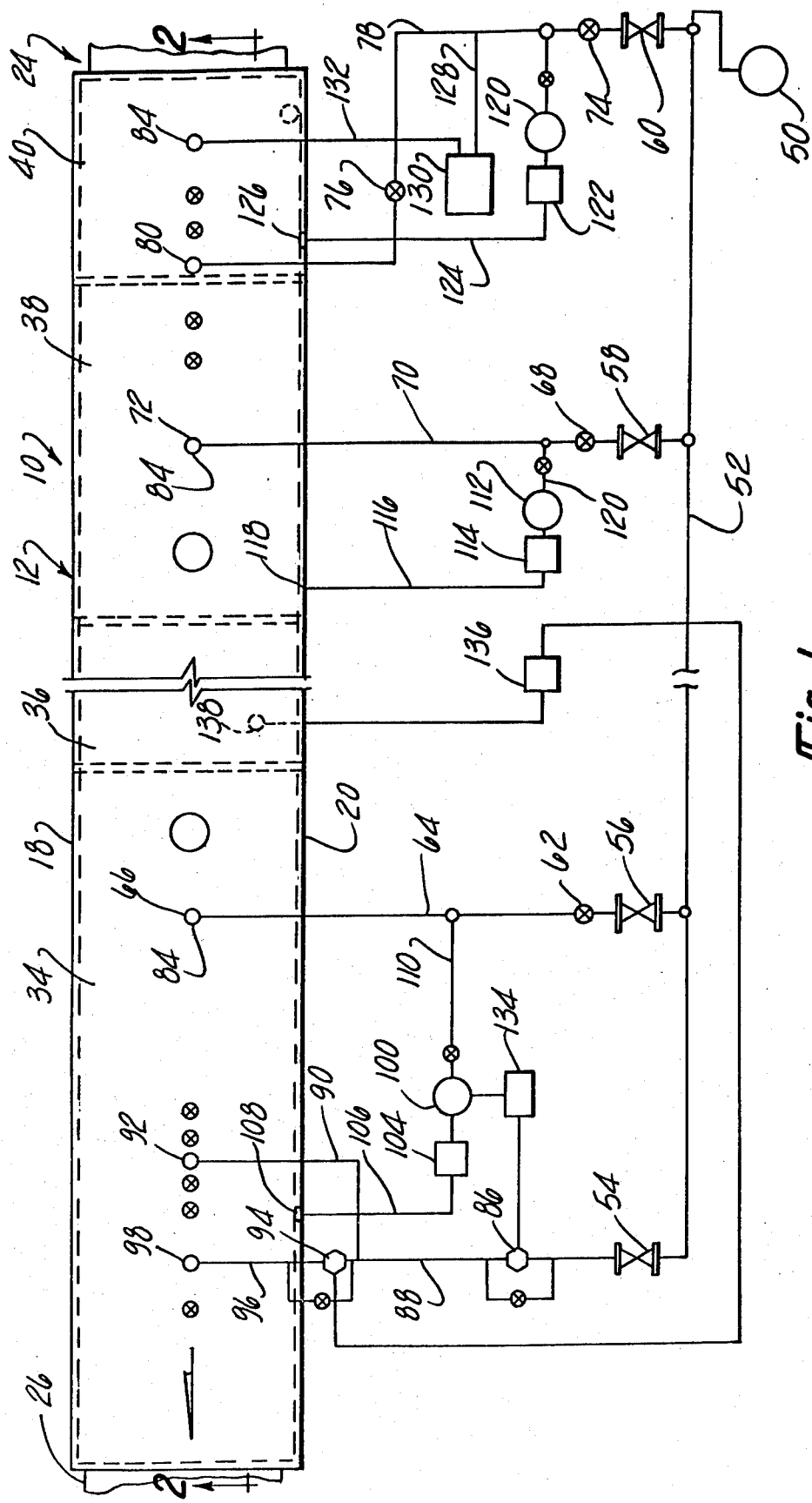
FIG. 1 is a top diagrammatic view illustrating the conveyor system according to the present invention.
Figure 2:
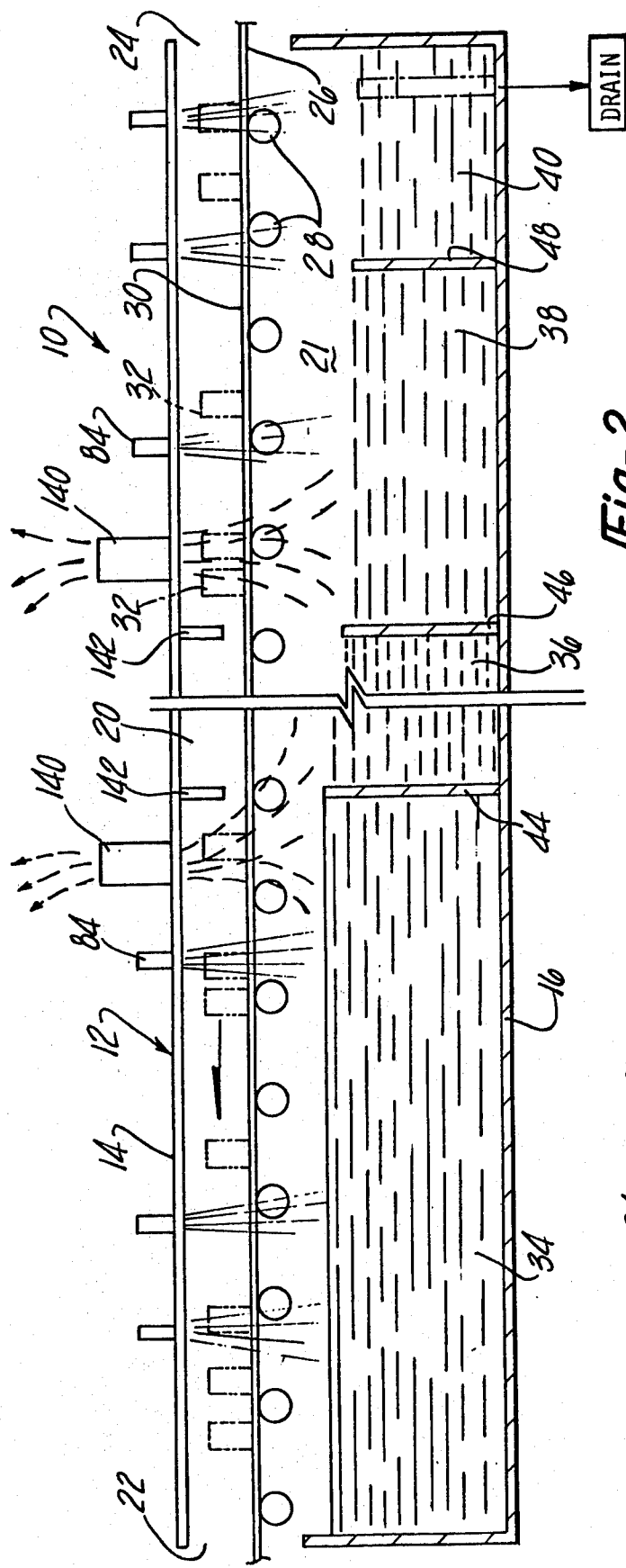
FIG. 2 is a sectional view taken substantially along line 2—2 in FIG. 1.

With reference first to FIGS. 1 and 2, the article transporting or conveyor system 10 according to the present invention is thereshown having an elongated housing 12. The housing 12 includes an upper wall 14, a bottom wall 16 and sidewalls 18 thus defining a substantially closed interior 20 for the housing 12. The housing 12, however, is open on each axial end 22 and 24.

An elongated endless conveyor belt 26 extends longitudinally through the interior 20 of the housing 12 and is supported along its length by a plurality of rollers 28 extending transversely across and rotatably mounted to the housing 12. Conventional means (not shown) longitudinally drive the endless conveyor belt 26 through the interior 20 of the housing 12 and from the direction of the inlet end 24 and toward the outlet end 22 of the housing 12. The upper surface 30 of the conveyor belt 26 forms a movable support surface upon which articles 32 are supported and transported along the length and through the interior 20 of the housing 12.

Figure 3:
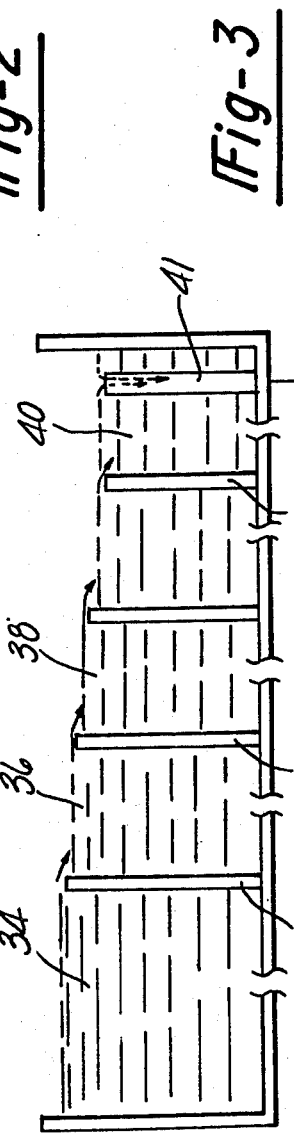
FIG. 3 is a fragmentary diagrammatic view illustrating the operation of the cooling means for the conveyor system of the present invention.

A plurality of fluid reservoirs 34, 36, 38 and 40 are formed within the housing 12 and underneath the conveyor belt 30. Each fluid reservoir extends longitudinally along the conveyor housing 12 and the reservoirs are longitudinally adjacent and separated from each other by vertically extending wall sections or dams 44, 46, and 48. Moreover, as is best shown in FIG. 3, the height of the dams 44, 46, and 48 decreases from the outlet end 22 of the housing 12 and toward the inlet end 24 so that the height of the fluid reservoirs 36–40 likewise decreases from the outlet end 22 and to the inlet end 24 for a reason to be subsequently described. A drain 41 maintains the fluid in the reservoir 40 adjacent the inlet end 24 at a predetermined level.

The means for cooling the articles 32 as they are transported by the conveyor belt 30 along the interior 20 of the conveyor housing 12 is best shown in FIG. 1 and comprises a source 50 of cooling fluid, typically cold water, connected by a supply line 52 to one side of a plurality of strainers 54, 56, 58, and 60. Each strainer 54–60 is connected to an individual cooling station.

The other side of the strainer 56 is connected by a valve 62 and fluid line 64 to a fluid inlet 66 to the reservoir 34 adjacent the outlet end 26 of the conveyor housing 12. Similarly, the other side of the strainer 58 is fluidly connected by a valve 68 and fluid line 70 to a fluid inlet 72 to the fluid reservoir 38 while the other side of the strainer 60 is connected by valves 74 and 76 and a fluid line 78 to a fluid inlet 80 for the reservoir 40 adjacent the inlet end 24 of the conveyor housing 12. Moreover, it is to be understood that although the article handling system 10 according to the present invention is shown in FIGS. 1 and 2 as having four fluid reservoirs with a strainer and valve arrangement fluidly connected to each fluid reservoir, the conveyor system can have more or fewer reservoirs while remaining within the scope of the invention.

With reference to both FIGS. 1 and 2, the cool water inlets 66, 72 and 80 are fluidly connected to spray heads 84 which spray the fluid downwardly onto the top 30 of the conveyor belt 26 after which the fluid enters and is collected in the various fluid reservoirs. Each fluid inlet 66, 72 and 80, however, is fluidly connected to spray heads 84 associated only with the associated fluid reservoir.

Unlike the strainers 56, 58 and 60, the other side of the strainer 54 is connected through a normally closed solenoid actuated valve 86 and fluid lines 88 and 90 to a fluid inlet 92 open to the fluid reservoir 34. A further normally closed solenoid actuated valve 94 has one end open to the fluid line 88 and is fluidly connected by a fluid line 96 to a further fluid inlet 98 which is also open to the reservoir 34 adjacent the outlet end 26 of the conveyor housing. The actuation and control of the valves 94 and 86 will be subsequently described in greater detail.

A fluid pump arrangement is associated with each fluid reservoir for pumping fluid from the reservoir and into the spray heads 84 associated with that reservoir. More specifically, referring to FIG. 1, the inlet of a pump 100 is connected via a fluid filter 104 and fluid line 106 to a drain 108 open to the reservoir 34. The outlet from the pump 100 in turn is connected by a fluid line 110 and the fluid line 64 to the spray head 84. Similarly, the inlet of a fluid pump 112 is connected via a filter 114 and fluid line 116 to a drain 118 open to the reservoir 38. The outlet from the pump 112 is in turn connected via a fluid line 120 and fluid line 70 to the spray head 84 associated with the fluid reservoir 38.

The inlet of a further pump 120 is connected via a filter 122 and fluid line 124 to a drain 126 open to the reservoir 40 adjacent the inlet end 24 of the conveyor housing 12. Unlike the previously described fluid circulating systems, however, the outlet of the pump 120 is fluidly connected by a fluid line 128 to a heat exchanger means 130 and by a fluid line 132 from the heat exchanger means 130 and to the spray head 84 open to the fluid reservoir 40 adjacent the inlet end 24 of the conveyor track.

As will become hereinafter more clearly apparent, the fluid within the reservoir 40 is hotter than the fluid in the other reservoirs so that the additional cooling of the fluid in the reservoir 40 by the heat exchanger 130 is preferred to minimize the consumption of the cooling fluid by the conveyor system 10.

A control means 134 controls the actuation of the pump 100 for the fluid reservoir 34 adjacent the outlet end 26 of the conveyor housing 12 and also controls the actuation of the solenoid valve 86. Thus, whenever the pump 100 is activated, the valve 86 is opened thus permitting fluid to flow from the fluid source 50 and into the fluid reservoir 34 via fluid lines 88 and 90.

The activation of the other solenoid valve 94, however, is controlled by control means 136 having a temperature sensor 138, such as a thermocouple, as its input control signal. The sensor 138 senses the temperature of the fluid in a reservoir upstream from the reservoir 34 (with respect to the direction of travel of the belt 26) and, when the temperature in this upstream reservoir exceeds a predetermined temperature, the control means 136 opens the valve 94 to supply additional cooling fluid from source 50 and to the reservoir 34. As shown in FIG. 1, the sensor 138 detects the temperature of the fluid in the reservoir 36 which is longitudinally adjacent the reservoir 34 although it could be any upstream reservoir.

The operation of the conveyor stream 10 will now be described. Initially, the valves 62, 68 and 74 are opened thus filling the reservoirs with fluid, typically water. When the reservoirs are sufficiently filled, the valves 62, 68 and 74 are closed.

The articles 32 which are transported and cooled along and through the interior 20 of the conveyor housing 12 enter the housing 12 at the inlet end 24 in a very hot condition, typically 300°–400° F., and are longitudinally carried by the conveyor belt 26 from the inlet end 24 and to the outlet end 26. As the articles are transported to the housing 20, activation of the fluid circulating pumps 100, 112 and 120 will circulate fluid from the reservoir and to the spray heads 84 so that the cooling fluid impinges upon and cools the articles 32. After impinging upon the articles 32, the fluid is subsequently collected in the respective reservoirs and recirculated through the spray heads 84. Moreover, the circulating pumps 100, 112 and 120 can be selectively activated in the event that the conveyor belt is not completely filled with articles so that the pumps spray the cooling fluid upon the articles only if they are transported along that particular section of the conveyor housing.

During prolonged use of the conveyor system 10 according to the present invention, the cooling fluid becomes heated by impinging upon the hot articles and, unless replenished by cooling fluid of a lower temperature, inadequately cools the articles 32. Moreover, since the articles 32 transported by the conveyor belt 26 are hottest when they enter the inlet end 24 of the conveyor housing and coolest when they exit from the outlet end 26, the temperature of the water in the reservoirs increases proportionately from the reservoir 34 adjacent the outlet end 26 and to the reservoir 40 adjacent the inlet end 24.

With reference now to FIGS. 1 and 3, activation of the pump 100 by the control means 134 also opens the solenoid valve 86, as has been previously described, and thus connects the source 50 of cooling fluid to the reservoir 38 via the fluid lines 88 and 90. Since the dams 44, 46 and 48 separating the reservoirs from each other decrease in vertical height from the outlet end 22 into the inlet end 24, the introduction of cooling fluid from the source 50 into the reservoir 34 causes a like amount of cooling fluid to wash over the dam and so that only relatively hot water from the reservoir 40 adjacent the inlet end 24 of the conveyor system enters the drain 41 and is removed from the system 10.

With reference to FIG. 1, in the event that additional cooling of the articles 32 is required, the temperature of the fluid in the reservoir 36 becomes heated above a predetermined temperature which is sensed by the thermocouple 138 and fed to the control means 136. The control means 136 then generates a signal to the solenoid valve 94 to open it and supply additional cooling fluid from the source 50 and to the reservoir 34. In this fashion, the temperature of the articles 32 can be carefully controlled as they exit from the conveyor system 10.

With reference now to FIG. 2, at least one exhaust fan 140 is mounted to the housing 12 and has its inlet open to the housing interior 20 and thus open to the upper surface 30 of the conveyor belt 26. The outlet or exhaust of the fan 140 is open exteriorly of the conveyor housing 12.

During the operation of the conveyor system 10, the fan 140, when activated, inducts air and water vapor away from the interior 20 of the housing 12, and thus away from the belt surface 30 on which the articles 32 are carried, and exhausts this air and water vapor exteriorly of the housing 12. The exhaustion of the water vapor from the housing interior increases the water evaporation from the reservoir as well as from water on the conveyed articles 32 and the belt surface 30 and this increase in evaporation increases the evaporative cooling of the articles 32. Furthermore, the cooling of the articles 32 by evaporative cooling of the articles 32 is accomplished with only minimal water loss.

From the foregoing, it can be seen that the conveyor system of the present invention provides a novel conveyor system with cooling means in which the temperature of the articles as they exit from the conveyor system can be carefully controlled via the thermocouple sensor 138 and the solenoid valve 194. Moreover, since only relatively hot water from the reservoir 40 is drained from the system, the cooling fluid, typically water, is efficiently employed thus minimizing consumption of the cooling water by the conveyor system.

Having described my invention, however, many modifications thereto will become apparent to those skilled in the art to which it pertains without deviation from the spirit of the invention as defined by the scope of the appended claims.

I claim:

1. An article transporting system comprising:
   an elongated housing defining a conveyor track and a substantially closed chamber surrounding the track,
   an elongated conveyor belt means mounted in said housing so that a portion of said belt means extends along said track, said belt means having an upper substantially planar surface which forms an article carrying surface;
   means for longitudinally moving said belt means along said track from an inlet end of the housing and towards an outlet end of the housing;
   at least one fluid reservoir formed in said housing beneath said belt means,
   means for spraying water onto articles carried on the article carrying surface, evaporative cooling means comprising at least one fan having an inlet open to said housing chamber and an outlet open exteriorly of said housing, and means for sensing the fluid temperature in said reservoir and operable to open fluid flow into said reservoir when the temperature in said fluid reservoir exceeds a predetermined value.

2. The invention as defined in claim 1 wherein said housing is open at said outlet end.

3. The invention as defined in claim 1 wherein said housing is open at said inlet end.

4. The invention as defined in claim 1 wherein said housing is open at both said inlet end and said outlet end.

5. The invention as defined in claim 1 wherein said reservoir has an upper surface, said upper reservoir surface being spaced downwardly from said upper surface of said conveyor belt means.

6. The invention as defined in claim 1 wherein said belt means is an endless conveyor belt.

* * * * *

UNITED STATES PATENT AND TRADEMARK OFFICE
CERTIFICATE OF CORRECTION

PATENT NO. : 4,354,357
DATED : October 19, 1982
INVENTOR(S) : Robert W. Hofstetter It is certified that error appears in the above—identified patent and that said Letters Patent is hereby corrected as shown below:

Col. 1, line 46, after "are", delete --not--.

Signed and Sealed this

Twenty-fifth Day of January 1983

[SEAL]

Attest:

GERALD J. MOSSINGHOFF

Attesting Officer     Commissioner of Patents and Trademarks